(12) United States Patent
Moon

(10) Patent No.: US 12,177,606 B2
(45) Date of Patent: Dec. 24, 2024

(54) METHOD OF ALLOWING USER TO PARTICIPATE IN VIDEO CONFERENCE USING QR CODE AND METHOD OF PARTICIPATING, BY USER, IN VIDEO CONFERENCE USING QR CODE

(71) Applicant: Daekyeong Moon, Seoul (KR)

(72) Inventor: Daekyeong Moon, Seoul (KR)

( * ) Notice: Subject to any disclaimer, the term of this patent is extended or adjusted under 35 U.S.C. 154(b) by 196 days.

(21) Appl. No.: 17/944,290

(22) Filed: Sep. 14, 2022

(65) Prior Publication Data

US 2024/0089410 A1 Mar. 14, 2024

(51) Int. Cl.
| | |
|---|---|
| *H04N 7/15* | (2006.01) |
| *G06K 7/14* | (2006.01) |
| *G06K 19/06* | (2006.01) |
| *H04L 9/32* | (2006.01) |
| *H04L 12/18* | (2006.01) |
| *H04L 61/58* | (2022.01) |
| *H04L 101/385* | (2022.01) |

(52) U.S. Cl.
CPC ........... *H04N 7/152* (2013.01); *G06K 7/1417* (2013.01); *G06K 19/06037* (2013.01); *H04L 9/3213* (2013.01); *H04L 12/1818* (2013.01); *H04L 12/1822* (2013.01); *H04L 61/58* (2022.05); *H04L 2101/385* (2022.05)

(58) Field of Classification Search
None
See application file for complete search history.

(56) References Cited

U.S. PATENT DOCUMENTS

| | | | | |
|---|---|---|---|---|
| 2009/0288159 | A1* | 11/2009 | Husemann | H04L 9/3271 726/16 |
| 2012/0023167 | A1* | 1/2012 | Hovdal | H04M 3/56 709/204 |
| 2013/0155173 | A1* | 6/2013 | Brady | H04M 3/567 348/E7.083 |
| 2014/0313282 | A1* | 10/2014 | Ma | H04N 7/141 348/14.09 |

FOREIGN PATENT DOCUMENTS

| | | |
|---|---|---|
| JP | 2019-194861 A | 11/2019 |
| JP | 2020-091651 A | 6/2020 |
| KR | 10-1667603 B1 | 10/2016 |
| KR | 10-1980337 B1 | 8/2019 |

* cited by examiner

*Primary Examiner* — Hemant S Patel
(74) *Attorney, Agent, or Firm* — Bridgeway IP Law Group, PLLC; Sang Ho Lee; Hyun Woo Shin

(57) ABSTRACT

Provided is a method of allowing a user to participate in a video conference using a quick response (QR) code, which is a method performed by a server connected to a plurality of participant terminals and a user terminal via a wired/wireless network, the method including: generating a conference session with the plurality of participant terminals to initiate the video conference; generating identification information for identifying the video conference so that the user terminal is allowed to access the video conference; transmitting the identification information to a participant intermediary terminal that is one of the plurality of participant terminals; and upon recognizing, by the user terminal, a QR code output on the participant intermediary terminal, allowing the user terminal to participate in the video conference.

6 Claims, 6 Drawing Sheets

METHOD OF ALLOWING USER TO PARTICIPATE IN VIDEO CONFERENCE USING QR CODE AND METHOD OF PARTICIPATING, BY USER, IN VIDEO CONFERENCE USING QR CODE

BACKGROUND

1. Field of the Invention

The present embodiment relates to a technology for allowing a user to participate in a video conference implemented in a wired/wireless network.

2. Discussion of Related Art

Video conferences may be seen in the scenes of sharing information about disaster situations, such as floods, typhoons, earthquakes, and wildfires, in the National Disaster Situation Office, which are often shown on TVs. Video conferencing systems for meeting rooms are mainly used by administrative agencies, public institutions, large companies, and global companies for remote video meetings between headquarters and each regional branch. Due to the recent COVID-19 pandemic, border lockdown and social distancing have become a daily routine, which leads to the non-face-to-face era in each country, and major changes, such as shifting to telecommuting, are boosting the popularity of video conference (or video meeting) solutions.

A video conference may be considered a real-time visual connection for communication between two or more people residing in different places. Video conferences focus on collaboration, unlike video calls, which focus on individuals. The simplest videoconferencing is the transfer of still images and text between two locations, and an extended form of videoconferencing has been developed into a video conferencing system for remote bilateral and multilateral communication, through technical support for sophisticatedly transmission of full-motion images and high-quality audio between multiple locations.

In fact, video conferencing is a technology that has been developed for a long time. AT&T launched the first video conference. With the computer revolution of the 1980s, video conferences spread. The computer revolution led to the invention of codecs and the advent of integrated services digital network (ISDN) broadband services, which allows visual images to be used for personal use. Since then, the popularity of video conferences has increased with the introduction of mobile phones and the advent of webcams.

Recently, as telecommuting has become common through video conferences, the development speed of video conferencing technology is accelerating. As mobile phones or personal computers have become widespread, next-generation video conferencing technology needs to generate and transmit a video containing the user's image in real time using the mobile phone's camera or webcam. Above all, there is a demand for a method that allows users to easily participate in video conferences anytime, anywhere with a terminal.

Accordingly, the present inventor has completed the present invention after long research on a technology that allows a user to conveniently utilize a video conference.

SUMMARY OF THE INVENTION

In this background, the present embodiment is directed to providing a technology that allows a new participant to participate in an already formed video conference using a quick response (QR) code.

The present embodiment is also directed to providing a technique of including a hash value in a uniform resource identifier (URI), a uniform resource locator (URL), or a uniform resource name (URN) through which a data stream for a video is transmitted.

The technical objectives of the present invention are not limited to the above, and other objectives may become apparent to those of ordinary skill in the art based on the following descriptions.

According to an aspect of the present invention, there is provided a method of allowing a user to participate in a video conference using a QR code, which is a method performed by a server connected to a plurality of participant terminals and a user terminal via a wired/wireless network, the method including: generating a conference session with the plurality of participant terminals to initiate the video conference; generating identification information for identifying the video conference so that the user terminal is allowed to access the video conference; transmitting the identification information to a participant intermediary terminal that is one of the plurality of participant terminals; and upon recognizing, by the user terminal, a QR code including the identification information, which is output on the participant intermediary terminal, allowing the user terminal to participate in the video conference.

In the method, the identification information may include a URI or a URL, and the user terminal may include a camera, and the QR code may be generated to allow the user terminal to execute a video conferencing program, operate the camera, and transmit a data stream for a video photographed by the camera to the server through the URI or the URL.

In the method, the identification information may include a URI or a URL, and the QR code may be generated to include the URI or URL by one of the server and the participant intermediary terminal.

In the method, the identification information includes a URI or URL, and the user terminal may include a camera, and the method may include: generating a token for determining whether the user terminal has authority to participate in the video conference; storing the identification information and the token such that the identification information and the token are mapped to each other; receiving a data stream related to a video photographed by the camera from the user terminal through the URI or the URL; and broadcasting the data stream for the video to the plurality of participant terminals.

In the method, the token may include information about the conference session and information about a participant who is allowed to log in to the conference session.

In the method, the identification may include a URI or a URL, and at least a part of the URI or URL may be generated to include a hash value.

According to another aspect of the present invention, there is provided a method of participating, by a user, in a video conference using a QR code in a wired/wireless network to which a server, a plurality of participant terminals, and a user terminal are connected, the method including: receiving, by a participant intermediary terminal, which is one of the plurality of participant terminals, identification information that identifies the video conference so that the user terminal is allowed to access the video conference; outputting, by the participant intermediary terminal, a QR code including the identification information; recognizing, by the user terminal, the QR code through the participant intermediary terminal; and upon determining that the user terminal has authority to participate in the video conference, transmitting, by the user terminal, a data stream for a video generated by the user terminal to the server according to the identification information.

In the method, the identification information may include a URI or a URL, and the video conference may be implemented on a video conferencing program or a web browser based on a real time messaging protocol (RTMP), a real time streaming protocol (RTSP), an HTTP live streaming (HLS) protocol, or a web real-time communication (WebRTC) protocol, and the method may further include: downloading, by the user terminal, the video conferencing program; executing, by the user terminal, the video conferencing program or the web browser according to the QR code; and operating, by the user terminal, the camera to generate a data stream for a video photographed by the camera.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

Figure 1:
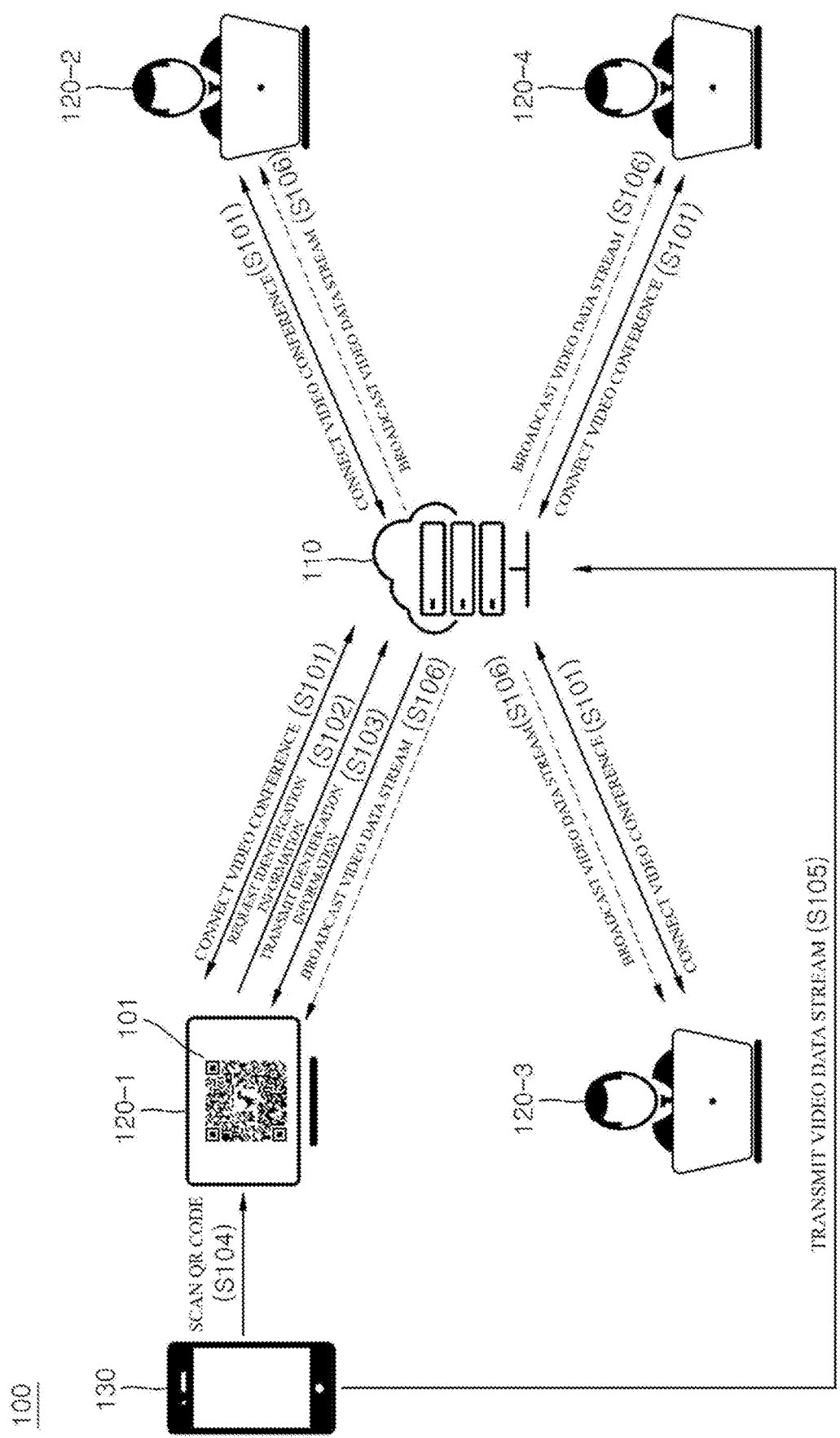
FIG. 1 is a block diagram illustrating a video conferencing system according to an embodiment.

The accompanying drawings are merely exemplary embodiments shown to describe the technical spirit of the present invention, and therefore, the technical spirit of the present invention is not limited to the form of the accompanying drawings.

DETAILED DESCRIPTION OF EXEMPLARY EMBODIMENTS

In the description of the present invention, the detailed description of related known functions or constructions will be omitted to avoid obscuring the subject matter of the present invention.

Terms used herein are used for describing the embodiments and are not intended to limit the scope and spirit of the present invention. It should be understood that the singular forms "a" and "an" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof.

Hereinafter, embodiments according to the present invention will be described in detail with reference to the accompanying drawings. The same or corresponding components are assigned the same reference numerals, and overlapping descriptions thereof will be omitted.

FIG. 1 is a block diagram illustrating a video conferencing system according to an embodiment.

Referring to FIG. 1, a video conferencing system 100 (hereinafter referred to as a "system") may include a server 110, a plurality of participant terminals 120-1, 120-2, 120-3, and 120-4, and a user terminal 130.

The system 100 may provide a video conferencing service between the terminals 120-1, 120-2, 120-3, 120-4, and 130. The server 110 and the terminals 120-1, 120-2, 120-3, 120-4, and 130 may be connected to each other through a wired/wireless network. Here, the wired/wireless network refers to a connection structure in which information may be exchanged between each node, such as the server 110 and the terminals 120-1, 120-2, 120-3, 120-4, and 130, and examples of the wired/wireless network includes the Internet, a local area network (LAN), a wireless LAN, a wide area network (WAN), a personal area network (PAN), 3G, 4G, 5G, Wi-Fi, Bluetooth, near field communication (NFC), radio frequency identification (RFID), a home network, and the like, but are not limited thereto.

The system 100 may allow the user terminal 130, which is another participant terminal, to additionally participate in a video conference (a video meeting) already formed between the plurality of participant terminals 120-1, 120-2, 120-3, and 120-4. The user terminal 130 is the same device as the plurality of participant terminals 120-1, 120-2, 120-3, and 120-4, and may perform the same function through the same configuration as those of the plurality of participant terminals 120-1, 120-2, 120-3, and 120-4. The terminals 120-1, 120-2, 120-3, 120-4, and 130 may transmit/receive an image through a wired/wireless network and output the image to a user or a participant. The terminals 120-1, 120-2, 120-3, 120-4, and 130 may include various devices, such as smartphones, mobile phones, tablet personal computers (PCs), desktop PCs, and laptops, but are not limited thereto. In the system 100, the server 110 may allow the user terminal 130 to participate in the video conference using a QR code 101, and the user terminal 130 may participate in the already formed video conference using the QR code 101.

Before the user terminal 130 participates in a video conference, the server 110 may provide the plurality of participant terminals 120-1, 120-2, 120-3, and 120-4 with a video conferencing service to form a video conference between the plurality of participant terminals 120-1, 120-2, 120-3, and 120-4 (S101).

Specifically, the server 110 may form a session for a video conference (a video conference session) with respect to the plurality of participant terminals 120-1, 120-2, 120-3, and 120-4. The server 110 may provide each of the plurality of participant terminals 120-1, 120-2, 120-3, and 120-4 with a connection state to exchange data or information for the video conference. The plurality of participant terminals 120-1, 120-2, 120-3, and 120-4 may participate in the conference session, and may use video conference resources provided by the server 110 within an allowed range. For example, each of the plurality of participants may log in to a web page through each of the participant terminals 120-1, 120-2, 120-3, and 120-4.

Here, one of the plurality of participant terminals 120-1, 120-2, 120-3, and 120-4 may operate as a participant intermediary terminal. In FIG. 1, the first participant terminal 120-1 may be illustrated as operating as a participant intermediary terminal. The user may participate in the previously formed video conference through the participant intermediary terminal 120-1. For example, the user terminal 130 may recognize identification information provided by the server 110 through the participant intermediary terminal 120-1 to participate in the video conference formed by the plurality of participant terminals 120-1, 120-2, 120-3, and 120-4. The user terminal 130 may not be directly connected to the participant intermediary terminal 120-1, but may be connected to the server 110 to receive a video conferencing service from the server 110. The recognition of the identification information may include a method of scanning, by the user terminal 130, a QR code 101 representing the identification information.

The identification information may be information for the terminals 120-1, 120-2, 120-3, 120-4, and 130 to distinguish or identify a video conferencing service provided by the server 110. The terminals 120-1, 120-2, 120-3, 120-4 and 130 may access the already formed video conference through the identification information. That is, the identification information may include the name or location of a resource of the video conference provided by the server 110, and the terminals 120-1, 120-2, 120-3, 120-4, and 130 may access the resource corresponding to the name or location. For example, the identification information may include a uniform resource identifier (URI), a uniform resource locator (URL), or a uniform resource name (URN). URI may indicate an identifier indicating a resource present on the network, URL may indicate the location of the resource on the network, and URN may indicate the name of the resource. The terminals 120-1, 120-2, 120-3, 120-4, and 130 may, upon scanning the QR code 101, recognize the URI, URL, or URN included in the QR code 101. The terminals 120-1, 120-2, 120-3, 120-4, and 130 may access a video conference resource corresponding to the URI, URL, or URN, generate a data stream for a video containing an image of the user's face, and transmit the data stream through the URI, URL, or URN.

Here, the identification information may be generated by the server 110. The server 110 may generate the identification information including a URI, URL, or URN, and store or preserve the identification information such that the identification information is mapped to a token.

The token may be used to determine whether the user terminal 130 has the authority to participate in a video conference. The server 110 may determine the participation authority. The server 110 may generate the token including information about participants and information about a conference session. The information about the participants may indicate whether the plurality of participant terminals 120-1, 120-2, 120-3, and 120-4 and the user terminal 130 are entitled to participate in a specific video conference. The information about the conference session may indicate a video conference in which the participant terminals 120-1, 120-2, 120-3, and 120-4 and the user terminal 130 are allowed to participate. The token may include information about a participant and information about a conference session that are matched with each other. Therefore, in a video conference according to information about a conference session, only participants included in information about participants matched with the information about the conference session may be allowed to participate.

Furthermore, the server 110 may store randomly generated identification information and a token such that the randomly generated identification information and a token are mapped to each other. For example, the server 110 may generate a random URL and store the URL such that the URL is mapped to a token. Then, the URL may be recognized by the user terminal 130 in the form of a QR code 101, and the user terminal 130 may transmit a data stream for a video containing an image of the user's face to the URL. The server 110 may determine, through the token mapped to the URL, whether the user terminal 130 that has transmitted the data stream has the authority to participate in a video conference previously formed by the plurality of participant terminals 120-1, 120-2, 120-3, and 120-4. Specifically, the server 110 may restore information about participants and information about a conference session from the token mapped to the URL. The server 110 may determine whether the information about participants corresponds to the user terminal 130, and upon determining that the information corresponds to the user terminal 130, acknowledge the participation authority of the user terminal 130, and allow the user terminal 130 to log in to the video conference according to the information about the conference session.

Once the server 110 generates the identification information and the token, one of the plurality of participant terminals 120-1, 120-2, 120-3, and 120-4 may request identification information, such as the QR code 101, in order to allow the user terminal 130 to participate in the already formed video conference (S102). One participant terminal (the participant intermediary terminal 120-1) among the participant terminals 120-1, 120-2, 120-3, and 120-4 may request the identification information.

The server 110 may transmit the identification information to the participant intermediary terminal 120-1 in response to the request of the participant intermediary terminal 120-1 (S103). The server 110 may transmit the identification information linked to the video conference already formed by the plurality of participant terminals 120-1, 120-2, 120-3, and 120-4. Then, the participant intermediary terminal 120-1 may output the identification information. Preferably, the participant intermediary terminal 120-1 may output the identification information in the form of a QR code 101. Here, the conversion of the identification information into the QR code 101 may occur at the participant intermediary terminal 120-1 or the server 110. For example, the participant intermediary terminal 120-1 may receive identification information, such as a URL, from the server 110 and convert the identification information into a QR code 101, or the server 110 may convert a URL into a QR code 101 and transmit the URL to the participant intermediary terminal 120-1.

The user terminal 130 may scan the QR code 101 output by the participant intermediary terminal 120-1 (S104). The user may read the QR code 101 displayed on a screen of the participant intermediary terminal 120-1 through the user terminal 130.

Then, the user terminal 130 may generate a data stream for a video containing the user's appearance and transmit the generated data stream to the server 110 (S105). The user terminal 130 may operate according to a command implied in the QR code 101. The identification information, such as the QR code 101, may include not only the URI, URL, or URN, but also a command for controlling the user terminal 130. The user terminal 130 may perform operations designated by the command in a predetermined order. For example, the QR code 101 may include a command for the user terminal 130 to execute a video conferencing program, turn on an image capturing device mounted on the user terminal 130, for example, a camera, to generate a video, and transmit a data stream for the video to the URL. The user terminal 130 may sequentially perform the operations according to the command. Accordingly, the user terminal 130 may execute the video conferencing program, turn on the camera to photograph an appearance of the user, and transmit a data stream for the video to the URL included in the QR code 101 according to the command included in the QR code 101. Hereinafter, the camera may be defined as a term including a device for generating an image by photographing a user, and may include a webcam.

Then, the server 110 may receive the data stream for the video from the user terminal 130. The server 110 may identify the URI, URL, or URN to which the data stream for the video is transmitted. The server 110 may extract a token mapped to the identified URI, URL, or URN, and restore information about participants and information about a conference session included in the extracted token, to determine the participation authority of the terminal 130 that has transmitted the data stream for the video. When the participation authority of the user terminal 130 is acknowledged, the transmission of the data stream for the video of the user terminal 130 may be continued. Conversely, when the participation authority of the user terminal 130 is denied, log-in to the conference session of the user terminal 130 may be rejected, and transmission of the data stream for the video may be stopped.

When the participation authority of the user terminal 130 is acknowledged, the server 110 may allow the user terminal 130 to log in to the already formed conference session and participate in the video conference according to the conference session. The server 110 may broadcast the data stream for the video transmitted by the user terminal 130 to the plurality of participant terminals 120-1, 120-2, 120-3, and 120-4 (S106).

Meanwhile, the plurality of participant terminals 120-1, 120-2, 120-3, and 120-4 and the user terminal 130 may download a video conferencing program to participate in the video conference. In this case, the QR code 101 may include a command to execute the video conferencing program. Additionally, the system 100 may implement the video conference on a web browser. In this case, the QR code 101 may include a command to operate the web browser instead of executing the video conferencing program. Then, the user may execute the video conference on the web browser through the user terminal 130 without a separate program. Here, as for the video conferencing program and the web browser, the video conference may be implemented based on a data streaming protocol in an application program, e.g., the video conferencing program, or a web browser including a dedicated mobile web browser. The data streaming protocol may include instructions for controlling the streaming of data between the server 110 and a client (e.g., the terminals 120-1, 120-2, 120-3, 120-4, and 130). Representative examples of the data streaming protocol may use a real time messaging protocol (RTMP), a real time streaming protocol (RTSP), an HTTP live streaming (HLS) protocol, or a web real-time communication (WebRTC) protocol.

Figure 2:
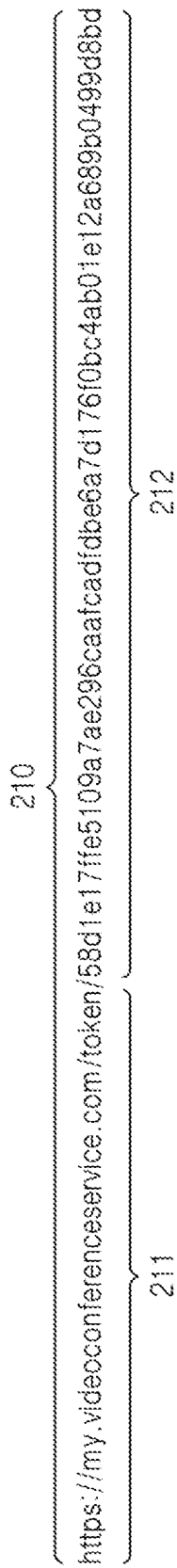
FIG. 2 is an exemplary diagram illustrating identification information including a hash value according to an embodiment.

FIG. 2 is an exemplary diagram illustrating identification information including a hash value according to an embodiment.

Referring to FIG. 2, an example of identification information for allowing a user terminal to participate in a video conference may be illustrated. The identification information may include a URI, URL, or URN, and the server may encrypt a part of the URI, URL, or URN. Preferably, the part of the identification information may be provided as a hash value.

For example, identification information 210 may be in the form of a URL. Then, the identification information 210 may include a non-hash value part 211 and a hash value part 212. That is, a part of the URL indicating the location of the video conference resource may be formed as a hash value. The server may generate the hash value using a secure hash algorithm-256 (SHA-256) algorithm. The method may block malicious users from arbitrarily accessing the URL, thereby increasing security.

Figure 3:
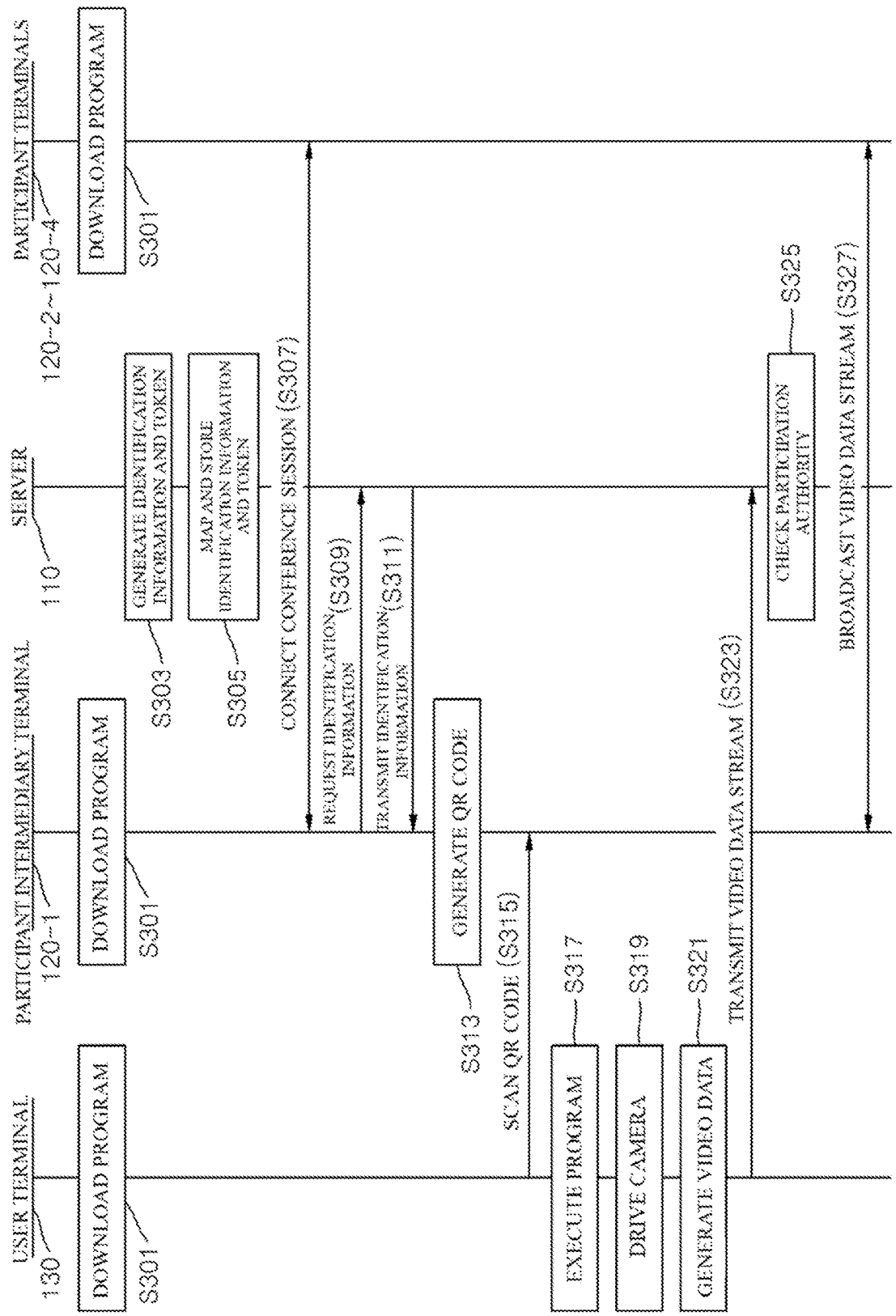
FIG. 3 is a flowchart showing an operation of a video conferencing system according to an embodiment.

FIG. 3 is a flowchart showing an operation of a video conferencing system according to an embodiment.

Referring to FIG. 3, the operation of the system according to one embodiment is illustrated.

The plurality of participant terminals 120-1, 120-2, 120-3, and 120-4 already participating in a video conference and the user terminal 130 may download a video conferencing program through a wired/wireless network (S301).

The server 110 may generate identification information, such as a URI, a URL, or a URN, for identifying a resource of a video conference and a token for checking the participation authority of the user terminal 130 (S303). The token may include information about participants and information about a conference session.

The server 110 may store arbitrary identification information and a token such that the arbitrary identification information and the token are mapped to each other (operation S305).

The server 110 may generate a conference session with the plurality of participant terminals 120-1, 120-2, 120-3, and 120-4 to initiate a video conference (S307).

One of the plurality of participant terminals 120-1, 120-2, 120-3, and 120-4 may perform an intermediary function to allow the user terminal 130 to participate in the already formed video conference. Here, the first participant terminal 120-1 may act as an intermediary for the user terminal 130. Thus, the participant intermediary terminal 120-1 may request identification information from the server 110 (S309).

The server 110 may transmit the identification information to the participant intermediary terminal 120-1 in response to the request for the identification information (S311).

The participant intermediary terminal 120-1 may convert the identification information to generate a QR code (S313). Here, the QR code is illustrated as being generated by the participant intermediary terminal 120-1, but is not limited thereto, and may be generated by the server 110 and transmitted to the participant intermediary terminal 120-1.

The user terminal 130 may scan the QR code output from the participant intermediary terminal 120-1 (S315).

The user terminal 130 may, upon recognizing the QR code, perform a certain operation according to a command included in the QR code. The user terminal 130 may execute the video conferencing program (S317), drive the camera (S319), and generate a data stream for a video containing the user's appearance (S321). Then, the user terminal 130 may transmit the data stream of the video to the server 110 (S323).

The server 110 may, upon receiving the data stream for the video, check whether the user terminal 130, which is a sender, has the authority to participate in the already formed video conference (S325). The server 110 may check the participation authority using a URI, URL, or URN to which the data stream for the video is transmitted and a token mapped to the URI, URL, or URN. When the participation authority is acknowledged, the server 110 may broadcast the data stream for the video transmitted by the user terminal 130 to the other participant terminals 120-2, 120-3, and 120-4 (S327).

Figure 4:
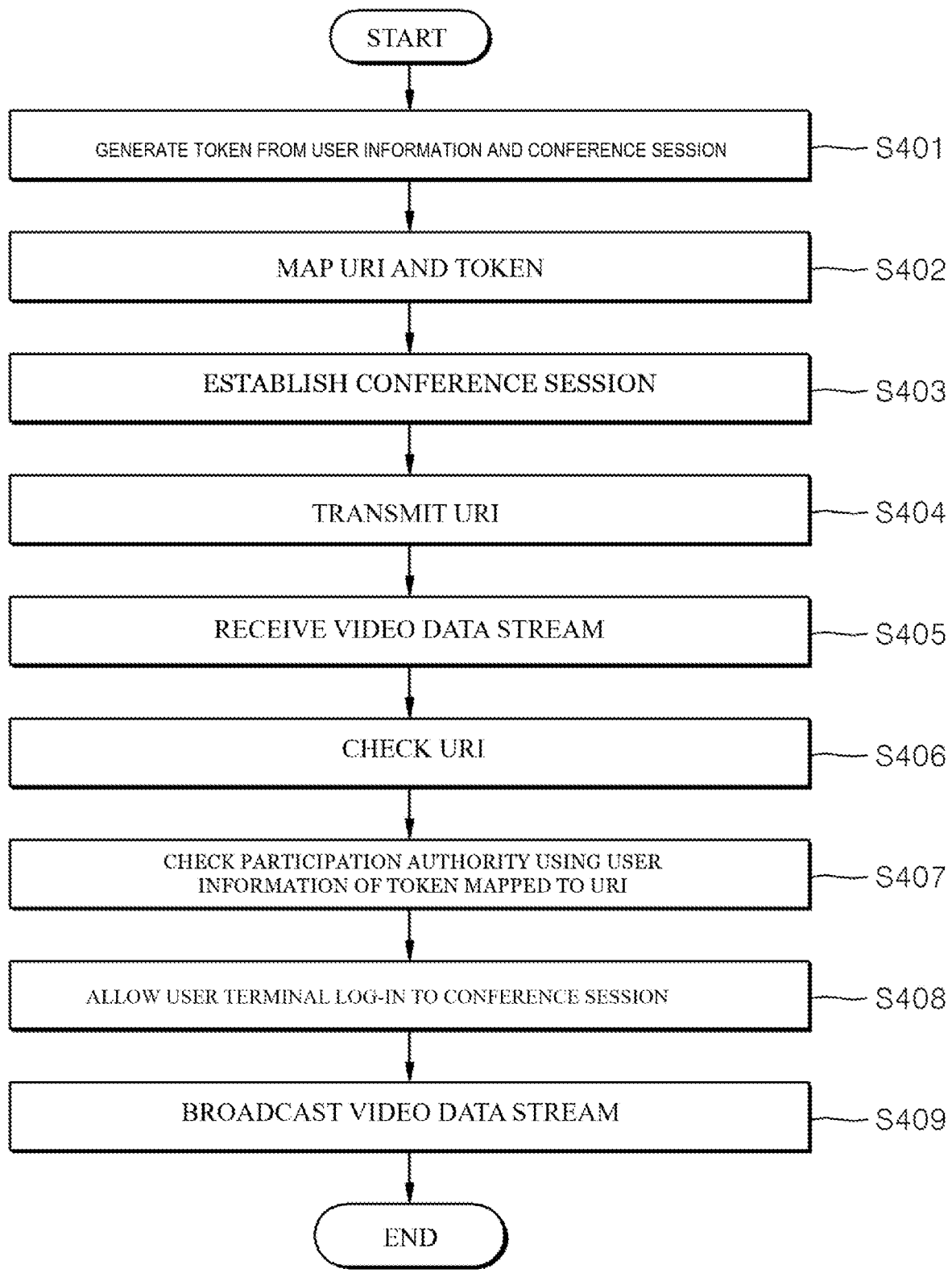
FIG. 4 is a flowchart showing an operation of a server according to an embodiment.

FIG. 4 is a flowchart showing an operation of a server according to an embodiment.

Referring to FIG. 4, the server may generate identification information and a token to initiate a video conference between a plurality of participant terminals (S401). The identification information may include a URI, URL, or URN that identifies a video conference resource, and the token may include information about a video conference and participant terminals that are allowed to participate in the video conference.

The server may map the identification information (e.g., a URI) and the token to each other, and store a result of the mapping (S402).

The server may preferentially establish a conference session between a plurality of participant terminals through the URI and the token (S403). A new user terminal may access the conference session.

The new user terminal may request a URI from the server to access the already formed conference session. In response, the server may transmit the URI to the user terminal (S404).

The server may receive a data stream for a video from the user terminal through the URI included in a QR code (S405). The server may identify the URI accompanying the data stream for the video (S406).

The server may check the participation authority of the user terminal through user information of the token mapped to the URI (S407).

The server may, upon acknowledging that the user terminal that has transmitted the video data stream has the participation authority, allow the user terminal to log in to the already formed conference session (S408).

When the login is allowed, the user terminal may continuously transmit the data stream for the video to the server. The server may broadcast the data stream for the video to the plurality of other participant terminals participating in the video conference (S409).

Figure 5:
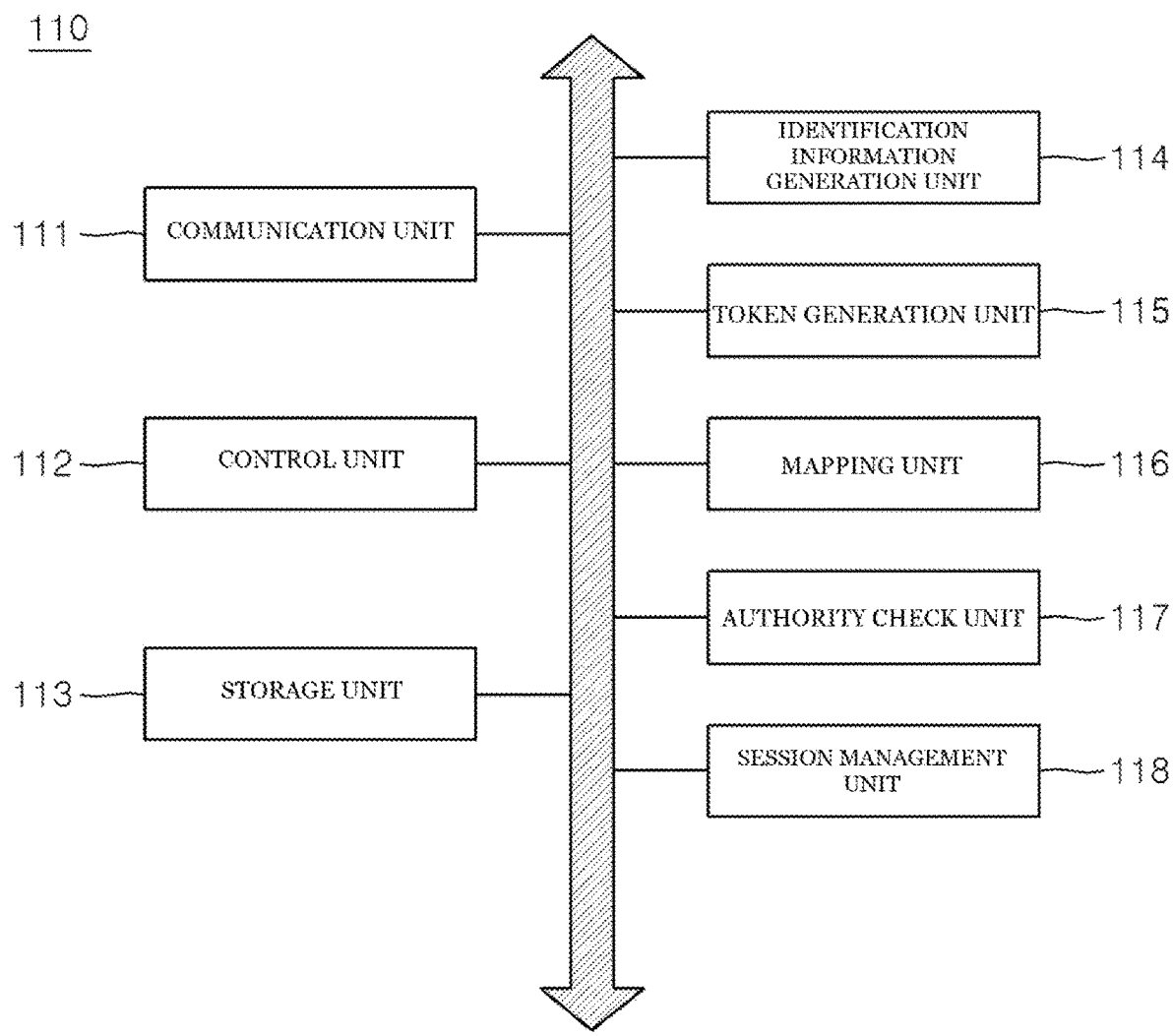
FIG. 5 is a block diagram illustrating a server according to an embodiment.

FIG. 5 is a block diagram illustrating a server according to an embodiment.

Referring to FIG. 5, the block diagram of the server according to the embodiment is illustrated. The server 110 may include a communication unit 111, a control unit 112, a storage unit 113, an identification information generation unit 114, a token generation unit 115, a mapping unit 116, an authority check unit 117, and a session management unit 118.

The communication unit 111 may transmit or receive data or a stream to or from a device connected to the server 110 through a wired/wireless network. The communication unit 111 may include a network interface (NIC). The control unit 112 may execute a command or program and control other components through a processor. In the storage unit 113, data, such as information about participants and information about a conference session, may be stored.

The identification information generation unit 114 may generate identification information for identifying a video conference so that a new user is allowed to access the video conference. The token generation unit 115 may generate a token used to check the authority of a new user to participate in a video conference. The mapping unit 116 may map arbitrary identification information (a URI, URL, or URN) and a token to each other and store a result of the mapping in the storage unit 113. The authority check unit 117 may check the participation authority of a user terminal through a token mapped to a URI, URL, or URN accompanying a data stream transmitted by the user terminal. The session management unit 118 may establish a conference session between the server 110 and the participant terminals and maintain the conference session.

Figure 6:
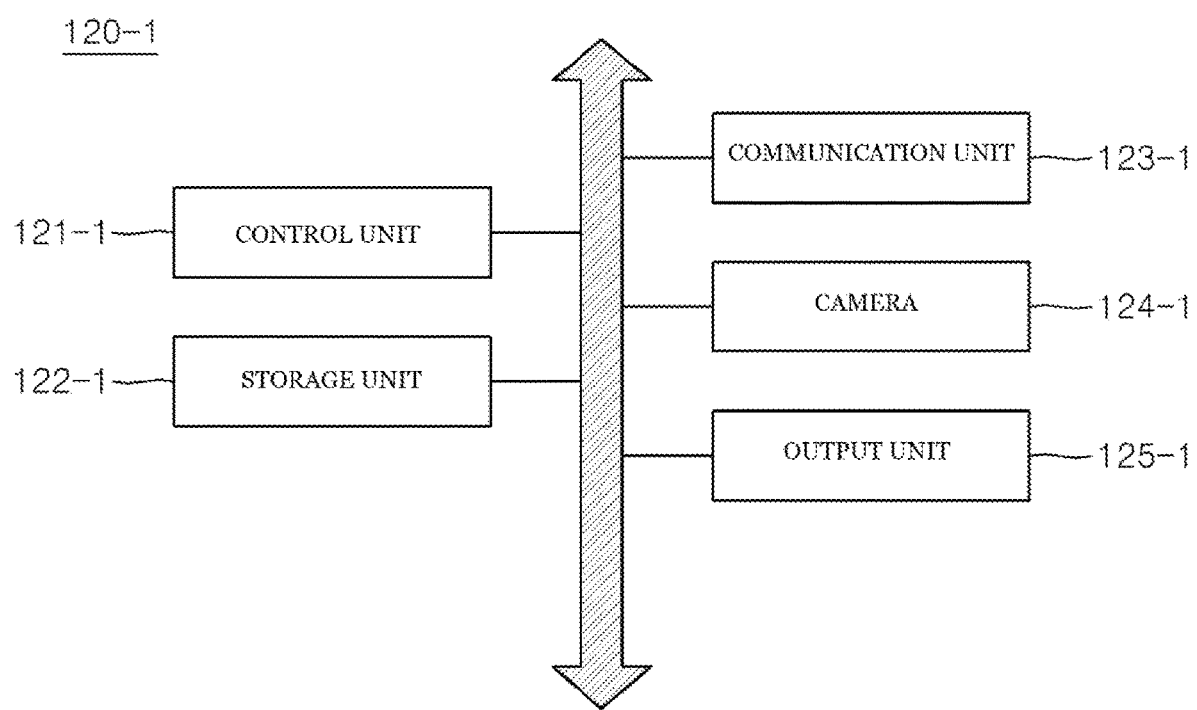
FIG. 6 is a block diagram illustrating a user terminal participating in a video conference according to an embodiment.

FIG. 6 is a block diagram illustrating a participant user terminal according to an embodiment.

Referring to FIG. 6, a block diagram of a participant terminal 120-1 according to the embodiment is illustrated. In FIG. 6, only the first participant terminal 120-1 is illustrated, but the following description will be equally applied to a plurality of other participant terminals (120-2, 120-3, and 120-4 in FIG. 1) and a user terminal (130 in FIG. 1). The first participant terminal 120-1 may include a control unit 121-1, a storage unit 122-1, a communication unit 123-1, a camera 124-1, and an output unit 125-1.

The communication unit 123-1 may transmit or receive data or a stream to or from a device connected to the first participant terminal 120-1 through a wired/wireless network. The communication unit 123-1 may include a network interface. The control unit 121-1 may execute a command or program and control other components through a processor. The storage unit 122-1 may store identification information, a video conferencing program, or data regarding a video. The output unit 125-1 may output identification information in the form of a QR code. The first participant terminal 120-1 may operate the output unit 125-1 to serve as a participant intermediary terminal. The user terminal may recognize the QR code displayed on the output unit 125-1 to participate in a video conference. The camera 124-1 may photograph the appearance of a participant or user to acquire a video.

Elements, units, blocks, or modules used in the embodiments may be implemented in software, such as tasks, classes, subroutines, processes, objects, threads of execution, and programs in a predetermined area on a memory or hardware, such as a field programmable gate array (FPGA) or an application specific integrated circuit (ASIC), or a combination of software and hardware. The elements or units may be included in a computer-readable storage medium, or a part thereof may be distributed in a plurality of computers. Also, one or more of the elements may be implemented using one or more computing devices, or a part of the computing devices. Such devices include, for example, PCs, server computers, handheld or laptop devices, multiprocessor systems, microcontroller-based systems, set top boxes, programmable consumer electronics, network PCs, minicomputers, mainframe computers, cellular phones, personal digital assistants (PDAs), gaming devices, printers, appliances including set-tops, media centers, or other appliances, vehicle-embedded or attached computing devices, other mobile devices, distributed computing environments including any of the systems or devices described above, and the like.

Meanwhile, the disclosed embodiments may be implemented in the form of a recording medium storing a program and/or instructions executable by a computer. Instructions may be stored in the form of program code, and when executed by a processor, may generate program modules to perform operations according to the disclosed embodiments. The recording medium may be implemented as a computer-readable recording medium. The computer-readable recording medium includes all types of recording media in which instructions readable by a computer are stored. Examples of the recording medium may include a read only memory (ROM), a random access memory (RAM), a magnetic tape, a magnetic disk, a flash memory, an optical data storage, and the like.

As is apparent from the above, a user can conveniently participate in a video conference anytime, anywhere.

According to the present embodiment, a malicious user can be prevented from participating in a video conference by transmitting a data stream for a video through a URI, URL, or URN encrypted with a hash algorithm.

The scope of protection of the present invention is not limited by description and representation of the embodiments explicitly described above. In addition, it should be understood that the scope of protection of the present invention is not limited by changes or substitutions obvious in the technical field to which the present invention pertains.

What is claimed is:

1. A method of allowing a user to participate in a video conference using a quick response (QR) code, which is a method performed by a server connected to a plurality of participant terminals and a user terminal via a wired/wireless network, the method comprising:
generating a conference session with the plurality of participant terminals to initiate the video conference;
randomly generating identification information for identifying a resource of the video conference so that the user terminal is allowed to access the video conference, the identification information including a uniform resource identifier (URI);
generating a token for determining whether the user terminal has authority to participate in the video conference, the token including information about participants and information about a conference session;
storing the URI and the token such that the URI and the token are mapped to each other;
transmitting the URI to a participant intermediary terminal that is one of the plurality of participant terminals to generate a QR code including the URI by the participant intermediary terminal;
when the generated QR code including the URI, which is output on the participant intermediary terminal, is recognized by the user terminal, receiving a data stream from the user terminal through the URI;
determining whether the user terminal has the authority to participate in the video conference from the token mapped to the URI; and
upon determining that the user terminal has the authority to participate in the video conference, allowing the user terminal to participate in the video conference,
wherein the information about the participants includes information about qualifications of the plurality of participant terminals and the user terminal to participate in the video conference, and the information about the conference session includes information about a video conference in which the plurality of participant terminals and the user terminal are allowed to participate, and
wherein the determining of whether the user terminal has the authority to participate in the video conference includes restoring the information about the participants and the information about the conference session and matching the restored information with the user terminal.

2. The method of claim 1, wherein:
the user terminal includes a camera; and
the QR code is generated to allow the user terminal to execute a video conferencing program, operate the camera, and transmit a data stream for a video photographed by the camera to the server through the URI.

3. The method of claim 1, wherein:
the user terminal includes a camera;
the data stream is related to a video photographed by the camera; and
the method further comprises broadcasting the data stream for the video to the plurality of participant terminals.

4. The method of claim 1, wherein at least a part of the URI is generated to include a hash value.

5. A method of participating, by a user, in a video conference using a quick response (QR) code in a wired/wireless network to which a server, a plurality of participant terminals, and a user terminal are connected, the method comprising:
receiving, by a participant intermediary terminal, which is one of the plurality of participant terminals, a uniform resource identifier (URI) that identifies the video conference so that the user terminal is allowed to access the video conference;
generating, by the participant intermediary terminal, a QR code including the URI and outputting the generated QR code including the URI;
recognizing, by the user terminal, the QR code through the participant intermediary terminal; and
upon determining that the user terminal has authority to participate in the video conference, transmitting, by the user terminal, a data stream for a video generated by the user terminal to the server according to the URI,
wherein the server is configured to:
randomly generate the URI;
in order to determine whether the user terminal has the authority to participate in the video conference, generate a token including information about participants and information about a conference session;
store the URI and the token such that the URI and the token are mapped to each other;
upon receiving the data stream through the URI, restore the information about the participants and the information about the conference session from the token mapped to the URI and match the restored information with the user terminal to determine whether the user terminal has the authority to participate in the video conference; and
upon determining that the user terminal has the authority to participate in the video conference, allow the user terminal to participate in the video conference.

6. The method of claim 5, wherein:
the user terminal includes a camera;
the video conference is implemented on a video conferencing program or a web browser based on a real time messaging protocol (RTMP), a real time streaming protocol (RTSP), an HTTP live streaming (HLS) protocol, or a web real-time communication (WebRTC) protocol, and
the method further comprises:
downloading, by the user terminal, the video conferencing program;
executing, by the user terminal, the video conferencing program or the web browser according to the QR code; and
operating, by the user terminal, the camera to generate a data stream for a video photographed by the camera.

* * * * *